(12) United States Patent
Lehtimäki

(10) Patent No.: US 7,227,873 B2
(45) Date of Patent: Jun. 5, 2007

(54) NEGOTIATION OF USED COMMUNICATION MODE IN A TELECOMMUNICATIONS SYSTEM

(75) Inventor: Matti Lehtimäki, Espoo (FI)

(73) Assignee: Nokia Corporation, Espoo (FI)

( * ) Notice: Subject to any disclaimer, the term of this patent is extended or adjusted under 35 U.S.C. 154(b) by 1060 days.

(21) Appl. No.: 10/205,622

(22) Filed: Jul. 26, 2002

(65) Prior Publication Data

US 2003/0031200 A1 Feb. 13, 2003

Related U.S. Application Data

(63) Continuation of application No. PCT/FI01/00079, filed on Jan. 29, 2001.

(30) Foreign Application Priority Data

Feb. 1, 2000 (FI) ................................. 20000212

(51) Int. Cl.
 *H04J 3/16* (2006.01)
 *H04J 3/12* (2006.01)
(52) U.S. Cl. ...................................... 370/467; 370/522
(58) Field of Classification Search ................ 370/467, 370/328, 465, 522; 375/222
 See application file for complete search history.

(56) References Cited

U.S. PATENT DOCUMENTS

| 5,596,575 | A | * | 1/1997 | Yang et al. ................. 370/468 |
| 6,108,560 | A | * | 8/2000 | Navaro et al. .............. 455/517 |
| 6,167,040 | A | * | 12/2000 | Haeggstrom ................ 370/352 |
| 6,295,302 | B1 | * | 9/2001 | Hellwig et al. ............. 370/522 |
| 6,349,197 | B1 | * | 2/2002 | Oestreich ................... 455/63.1 |
| 6,381,459 | B1 | * | 4/2002 | Gervens et al. ............. 455/445 |
| 6,556,844 | B1 | * | 4/2003 | Mayer ........................ 455/560 |

FOREIGN PATENT DOCUMENTS

EP 841 831 5/1998

(Continued)

OTHER PUBLICATIONS

ITU-T Recommendation V.140, "Procedures for establishing communication between two multiprotocol audiovisual terminals using digital channels at a multiple of 64 or 56 kbit/s", Feb. 1998, 41 pp.

(Continued)

*Primary Examiner*—Chau Nguyen
*Assistant Examiner*—U-Lun Wang
(74) *Attorney, Agent, or Firm*—Pillsbury Winthrop Shaw Pittman LLP

(57) ABSTRACT

A method and an apparatus for negotiating the used communication mode in a telecommunications system, wherein a connection is arranged between at least two system elements. The system elements exchange messages and check whether a first in-band signalling protocol is supported. The communication mode is selected according to the first signalling protocol if the system elements support the first signalling protocol. If the first signalling protocol is not supported, support for a tandem free operation (TFO) protocol is checked and communication between the system elements is continued according to TFO procedures if the system elements support TFO. If the first signalling protocol and TFO are not supported, the communication mode between the system elements may be selected according to a second in-band signalling protocol.

21 Claims, 3 Drawing Sheets

FOREIGN PATENT DOCUMENTS

| | | |
|---|---|---|
| WO | WO 00/13609 | 3/1999 |
| WO | WO 99/20021 | 4/1999 |
| WO | WO 00/70885 | 11/2000 |
| WO | WO 01/05109 | 1/2001 |
| WO | WO 01/58109 | 8/2001 |

OTHER PUBLICATIONS

GSM.08.62 V7.0.0 (Feb. 1999), Digital cellular telecommunications system (Phase 2+); Inband Tandem Free Operation (TFO) of Speech Codecs; Service Description; Stage 3, 67 pp.

* cited by examiner

NEGOTIATION OF USED COMMUNICATION MODE IN A TELECOMMUNICATIONS SYSTEM

This application is a Continuation of International Application PCT/FI01/00079 filed Jan. 29, 2001 which designated the U.S. and was published under PCT Article 21(2) in English.

BACKGROUND OF THE INVENTION

The present invention relates to a method and equipment for negotiating a communication mode between system elements of a telecommunications system.

The first goal for circuit-switched and packet-switched telecommunications systems is to provide transmission means between end-users. Various kinds of interworking functions, such as rate adaptation, are needed between networks and terminals. Regardless of whether an underlying connection is circuit-switched or packet-switched, the system elements (involved in data transmission in networks or terminals) need to use common communication means before user data can be transferred. The usage of multi-mode system elements, that is, terminals and network elements supporting more than one communication mode, requires negotiation means for finding out the capabilities of the communicating elements. If the system elements are able to exchange information about the supported capabilities, the used communication mode (protocol), such as H.324 (Terminal for low-bit rate multimedia communication), may be selected. The communication mode selection may be done by in-band signalling, that is, utilizing the connection reserved for user data transmission, or by out-band signalling utilizing a separate signalling connection.

There are some interworking recommendations for multi-mode terminals, for instance the V.140 recommendation. V.140 is an ITU-T recommendation describing a standardized method for automatic communication mode negotiation, detection of bit alignment, and confirmation of sub-channel connectivity for multiprotocol audiovisual terminals on digital networks such as the ISDN (Integrated Services Digital Network).

V.140 procedures consist of three phases and begin following the establishment of an end-to-end digital connection before any multimedia or other communication protocols are initiated. V.140 procedures can also be used to provide an optional initial voice telephony mode before proceeding to multimedia telephony, and to switch from one multimedia telephony mode to another, or back into voice telephony mode. The V.140 procedures concern the flow of signals along the fixed digital paths at integer multiples of 64 kbit/s (or 56 kbit/s in certain networks). The means by which digital channels are established are outside the scope of V.140.

In general, an originating network, that is, the network the call is made from, does not know the capabilities of the terminating network or which communication mode to use. Thus, errors and disconnections may occur, if a system element of the terminating network does not support the desired communication mode, for example a multimedia call. Out-band signalling may be used, however, it is difficult to introduce new out-band signalling to existing systems. In-band signalling may also be faster, which may be needed in some cases, for example when a connection is changed from one base station to another (handover). It is also possible to use V.140, but there are communication modes that are not supported by V.140. V.140 is not very commonly used and V.140 procedures can not be used to negotiate the communication mode if the other end does not support V.140.

BRIEF DESCRIPTIONS OF THE INVENTION

The object of the invention is to provide improved procedures for communication mode negotiation. The object of the invention is achieved by a method and an apparatus which are characterized by what is disclosed in the independent claims. The preferred embodiments of the invention are set forth in the dependent claims.

The invention is based on using a first in-band signalling protocol, if possible, when negotiating the communication mode between system elements. The system elements exchange messages when a connection is available. Support for the first signalling protocol is checked based on the exchanged messages. If the system elements support the first signalling protocol, the communication mode is selected according to the procedures of the first signalling protocol based on supported communication modes. If the system elements do not support the first signalling protocol, support for a tandem free operation (TFO) protocol is checked based on the exchanged messages. If the system elements support the TFO protocol, the TFO procedures are continued. The first signalling protocol is advantageously based on the TFO protocol, however, the first signalling protocol may also be based on some other protocol, such as V.140.

According to a preferred embodiment of the invention, if there is at least one system element not supporting the first signalling protocol when checking the support for the first signalling protocol and there is at least one system element not supporting the TFO protocol when checking the support for the TFO protocol, the capabilities of the system elements are exchanged and the communication mode may be selected according to the procedures of a second in-band signalling protocol. In another preferred embodiment of the invention, according to the first signalling protocol, information on supported communication modes is transferred between the system elements. The supported communication modes are checked and a communication mode that the system elements support is selected. In further embodiment of the invention, the second signalling protocol is based on the V.140 protocol. In even further embodiment of the invention, the communication modes are prioritized and the communication mode is selected based on the prioritization.

The advantages of the invention are that less errors occur and less delay is caused in the service set-up, as the communication mode can be negotiated or re-negotiated using a first in-band signalling protocol, the TFO protocol or according to a preferred embodiment using a second in-band signalling protocol. It is possible to negotiate the used communication mode without any out-band signalling. During the negotiation audio samples may be transmitted without reducing the audio quality significantly. The usage of single numbering scheme is also enabled. According to embodiments of the invention, also the V.140 procedures may be used to negotiate the used communication mode and the communication modes may be prioritized e.g. based on the wishes of a user.

BRIEF DESCRIPTION OF THE FIGURES

In the following, the invention will be described in further detail by means of preferred embodiments and with reference to the accompanying drawings, in which.

DETAILED DESCRIPTION OF THE INVENTION

In the following, an embodiment of the invention will be described using UMTS (Universal Mobile Telecommunications System) as an example yet without limiting-the invention to that particular system. The invention can be used in any kind of circuit-switched or packet-switched telecommunications system.

Figure 1:
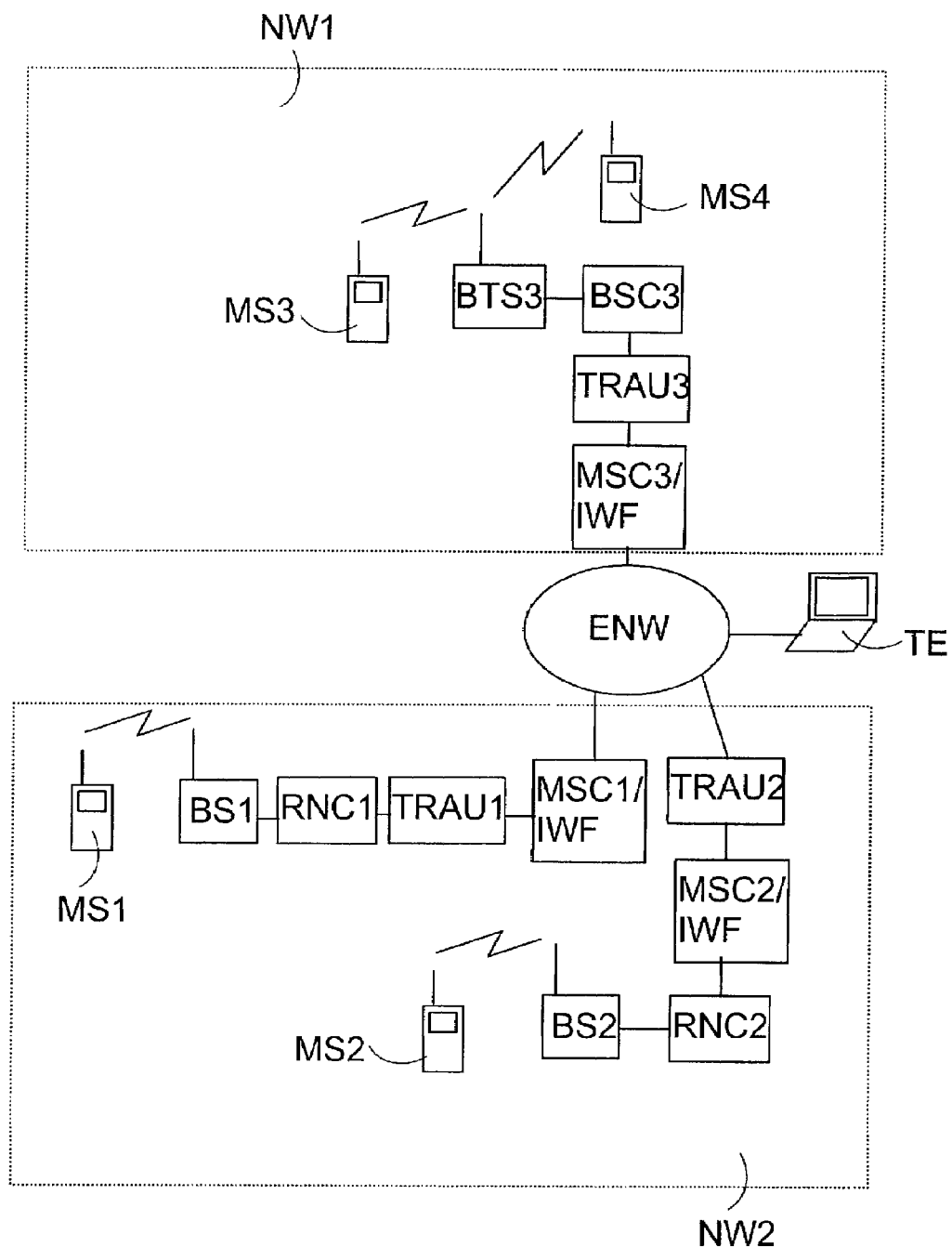
FIG. 1 illustrates a telecommunications system according to a preferred embodiment of the invention.

FIG. 1 illustrates a telecommunications system according to an embodiment of the invention. The network (NW1) is based on the GSM technology and the network (NW2) is based on UMTS, which is standardized by the 3GPP (Third Generation Partnership Project) organisation. The core network of UMTS is based on the GSM technology. This provides considerable savings, since expensive core networks do not have to be completely rebuilt, only evolutionary changes are needed because of new UMTS functions. This is why reference is made in the examples of the present description, when applicable, to the present GSM system, since, for the most part, the principles of signalling inside the core network remain the same. The invention may also be applied in system elements of fixed networks.

In FIG. 1, mobile stations (MS1, MS2) communicate with base stations (BS1, BS2) over at radio interface based on the WCDMA (Wideband Code Division Multiple Access) technology and mobile stations (MS3, MS4) communicate over at GSM radio interface with a base station (BTS3). The base stations (BS1, BS2) are controlled by radio network controllers (RNC1, RNC2) and the base station (BS3) is controlled by a base station controller (BSC3). Mobile switching centres (MSC1/IWF, MSC2/IWF, MSC3/IWF) manage circuit-switched services and communication with other networks. They take care of communication management and mobility management using two databases comprising information of mobile subscribers: the home location register HLR and the visitor location register VLR (not shown).

An interworking function IWF is a set of functions associated with the mobile switching centres (MSC1/IWF, MSC2/IWF, MSC3/IWF) providing the necessary functionality to allow interworking between mobile networks (NW1, NW2) and external networks (ENW). As in FIG. 1, interworking functions may be implemented in the mobile switching centres (MSC1/IWF, MSC2/IWF, MSC3/IWF) but it is also possible to have separate IWFs. The interworking functions depend on the services and the type of the external network (ENW), typically IWF comprises modems and rate adapters. The external network (ENW) may be any kind of telecommunications network, for example PSTN (Public Switched Telephone Network) or ISDN (Integrated Services Digital Network) network.

The main functions of transcoder units (TRAU1, TRAU2, TRAU3) are speech encoding and decoding, tandem-free operation functions, discontinuous transmission (DTX) functions, comfort noise generation and data rate adaptation. The transcoder units may support a number of speech codecs, for instance in the UMTS transcoder units (TRAU1, TRAU2) an AMR (Adaptive Multi-Rate) speech codec may be used. In GSM, the transcoder unit (TRAU3) belongs functionally to the base station sub-system (BTS3, BSC3) but the actual location is not strictly specified. The GSM transcoder unit (TRAU3) is controlled by the base station (BTS3) when positioned remote from the base stations. However, in UMTS, the transcoder units (TRAU1, TRAU2) belong functionally to the core network and are controlled by the mobile switching centers (MSC1/IWF, MSC2/IWF). It is further possible that the transcoder units (TRAU2) in UMTS are positioned between the mobile switching centres. Audio samples and control signals are transferred between the base stations and the transcoder units in frames denoted 'TRAU frames'. Audio transmission is generally arranged between transcoder units in a packed form as PCM (Pulse Code Modulation) samples. The bit rate for a speech channel is typically 64 kbits/s. When a call has been established in a mobile system between two mobile stations, speech originating from a mobile station may be coded twice, first in the mobile station and then in a transcoder unit of the terminating network. This situation is referred to as tandem coding, and it degrades speech quality.

Tandem coding can be avoided in mobile-to-mobile calls (MMC) by sending the frames received from a first base station with minor changes through two tandem-coded transcoder units to a second base station without the transcoder units carrying out any speech encoding or decoding. As a result, speech coding is only carried out in the mobile stations and the speech parameters are simply forwarded through the mobile communication network. This can be done using tandem-free operation (TFO) which considerably improves speech quality compared to the conventional tandem coding. TFO is established after connection set-up by in-band signalling. In the following, the high-level tasks of the TFO protocol are described. The in-band TFO protocol tests by TFO messages, if:

a mobile-to-mobile call is given;

the paths between the transcoder units are digitally transparent;

both transcoder units support TFO;

the codecs on both radio legs are identical.

If the above points are true, the TFO connection is established by commanding the paths to go transparent. Thus, the TRAU frames are modified into 'TFO frames' and the decoder/encoder functions are bypassed within the transcoder units. The TFO frames are transferred between the transcoder units by in-band signalling, i.e. by inserting them into the PCM sample bit-stream. In the case of GSM full rate and enhanced full rate speech traffic, these TFO frames are carried by 16 kbit/s traffic channels mapped onto the two least significant bits of the PCM samples. When the GSM half rate codec is used, the TFO frames are 160 bits in size and need a 8 kbit/s channel. This way, the tandem coding of audio samples in MMC can be avoided. The TFO protocol further guarantees a fall back procedure for a sudden TFO interruption and supports the resolution of codec mismatch situations. The TFO protocol is widely supported in mobile networks.

For more details on TFO in-band signalling, a reference is made to the GSM specification 08.62 "Inband Tandem Free Operation (TFO) of Speech Codecs", v. 7.0.0, February 1999. It should be noted that the final implementation of TFO in UMTS may differ to some extent from the GSM TFO and some out-band signalling may also be used with tandem-free operation in UMTS.

According to a preferred embodiment of the invention, the used communication mode between system elements, especially between transcoder units or interworking units, is negotiated by a first in-band signalling protocol, herein referred to as the ETN (Enhanced TFO Negotiation) protocol, advantageously based on the TFO protocol. The system elements may be part of a telecommunications network or a part of a terminal attached to a network and ETN procedures may be used in MMC calls and also in other types of calls. For instance, the system element may be a network element such as a mobile switching centre comprising an interworking function or a terminal comprising a terminal adaptation function.

Figure 2:
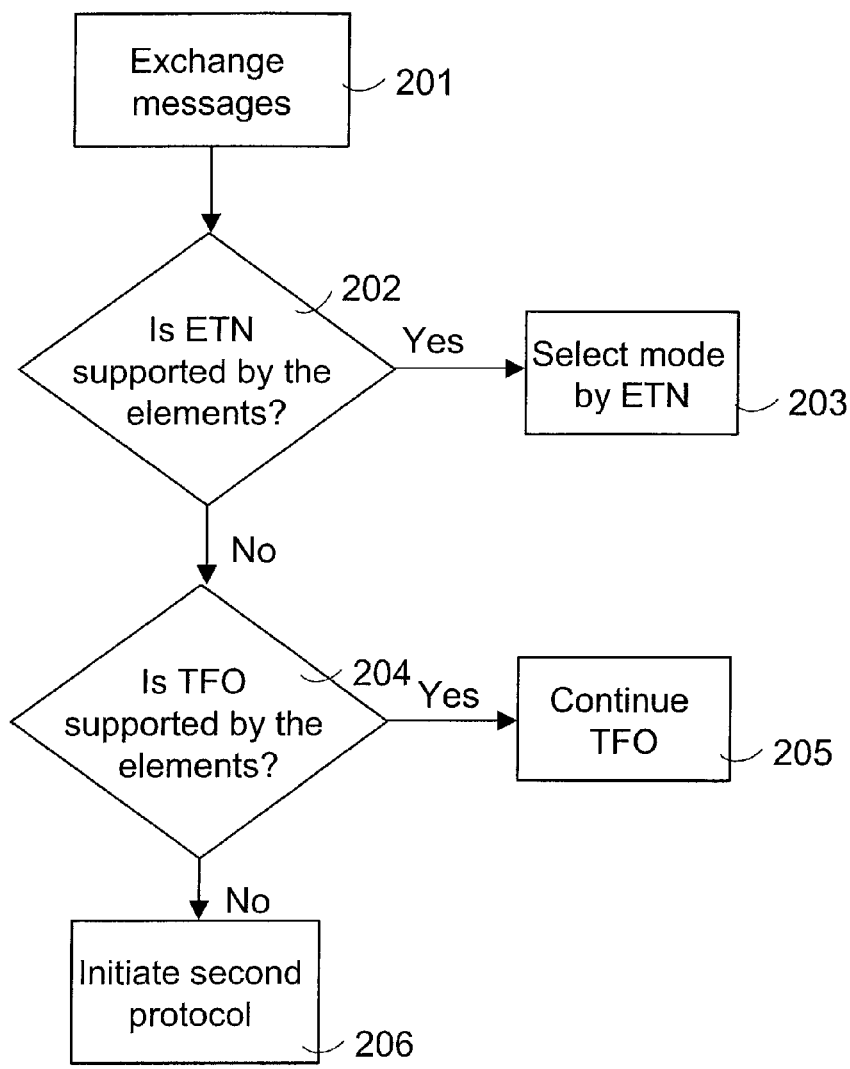
FIG. 2 is a flow chart according to a preferred embodiment of the invention illustrating the procedures needed for communication mode selection between system elements.

Referring to FIG. 2, when a connection between system elements has been established, the system elements exchange messages in order to establish communication between the elements (201). According to a preferred embodiment of the invention, support for the first in-band signalling protocol ETN is checked (202) based on the exchanged messages. If the system elements support ETN, ETN procedures may be used to select the used communication mode between the system elements (203). If the system elements do not support ETN, that is, at least one of them does not support ETN, support for TFO is checked (204) based on the exchanged messages. If the system elements support TFO, the communication between the system elements is continued according to the procedures of the TFO protocol (205) and a TFO speech connection may be negotiated. If the system elements do not support TFO, according to a preferred embodiment of the invention, a second protocol is initiated for communication mode selection (206). If there are more than two system elements involved in the communication mode selection, the procedures described above are carried out for all system elements.

Figure 3:
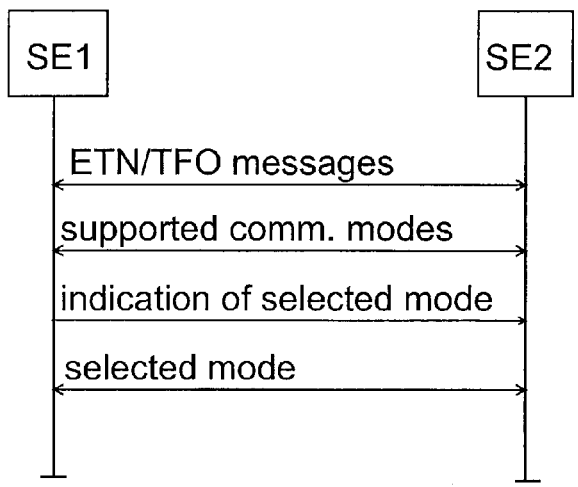
FIG. 3 is a signalling diagram according to a preferred embodiment of the invention illustrating procedures according to the first signalling protocol.

The communication mode selection based on ETN according to a preferred embodiment of the invention will be described in more detail in the following with reference to FIG. 3. The system elements SE1 and SE2 supporting either ETN or TFO send ETN or TFO messages to each other (ETN/TFO messages). The purpose of these messages is to check whether the other system element supports TFO or ETN and to initiate the ETN or TFO procedures. It should be noted that the system elements may start to send and search for messages after the connection is established and, thus, there is no pre-determined order for sending messages. However, it is possible that a system element sends ETN/TFO messages only after it has received messages from the other end. A system element supporting both ETN and TFO advantageously always starts with ETN messages.

Advantageously the ETN messages sent by ETN-capable system elements are TFO messages with an indication of ETN. The ETN messages are preferably inserted using a bit-stealing technique into the least significant bits of the signal (typically 64 kbit/s) so that, for example, every $n^{th}$ least significant bit is used. The ETN-capable system element knows based on the received messages whether to proceed with the ETN or TFO procedures or to continue with the second protocol.

According to a preferred embodiment of the invention, the ETN-capable system elements exchange messages comprising indications of the supported communication modes (supported comm. modes). This can be advantageously done when both system elements SE1 and SE2 have received ETN messages from each other, i.e. both elements know that the other end supports ETN. These communication modes may be fax mode (e.g. V.27), a modem mode (e.g. V.32bis, V.34), a multimedia mode (e.g. H.323, H.324) or a V.140 mode, without, however, being limited to those modes.

A preferable solution is to extend the TFO message [TFO ACK] with indications of the supported communication modes. Still one possible solution is to extend the [TFO REQ] message with indications of the supported communication modes and to send extended messages already at the beginning of the ETN signalling (ETN/TFO messages).

It is possible that the system elements prioritize modes, that is, include a notification at least about the desired communication mode in the supported mode message (supported comm. modes). It is possible that all supported communication modes are prioritized and the selection is done according to the priority order. The prioritization may be based on the purpose of the connection.

The used communication mode may then be selected based on the supported communication modes and possible prioritization. It is possible that the system element from which the connection has been established decides the communication mode or that the system elements select the communication mode independently. According to the example illustrated in FIG. 3, SE1 has initiated the connection and it selects the used communication mode (optimally the communication mode the user desires) and sends an indication of the selected mode to SE2 (indication of selected mode). SE1 and SE2 may then enter the selected communication mode (selected mode), for example the H.324 multimedia transmission mode. An acknowledgement may be required from SE2 before the selected mode can be entered. SE1 and SE2 advantageously use procedures of the TFO protocol if audio transmission is the only communication mode supported or the purpose of the connection is mobile-to-mobile speech call. It is also possible that SE1 allows SE2 to make the selection.

If the selected mode is V.140, it is not necessary to perform all the V.140 procedures as the communication already exists between the system elements. For instance, the V.140 phase 1, where support for V.140 is indicated, may be bypassed and the elements may begin the V.140 phase 2 after the ETN mode selection.

The ETN messages are in such a format that a system element supporting only TFO interprets them as valid TFO messages and responds according to the TFO procedures. Thus, if for example SE2 is only TFO-capable, it sends TFO messages (advantageously [TFO ACK]) to SE1. If the ETN messages are extended TFO messages, the TFO-capable SE2 ignores the extension and may send ordinary TFO messages. According to a preferred embodiment of the invention, the used communication mode between SE1 and SE2 is then going to be audio transmission and TFO may be negotiated between SE1 and SE2. This enables a fast TFO selection in cases where the other end is only TFO-capable.

It is important to note that either one of the system elements may be an ETN-capable element regardless of which of them has initiated the connection. ETN-capable system elements advantageously search at least for ETN and TFO messages. Thus, if the other system element sends only TFO messages, according to the ETN procedures, the ETN-capable system element finds out that TFO mode is selected and may enter ordinary TFO protocol and, thus, an ordinary TFO may be negotiated. If an ETN-capable system element is called but no indication about the call is received or the system element does not support indications, it may initiate ETN. Thus, the system element sends back ETN messages, and if no TFO or ETN messages are received, it advantageously enters the second protocol.

To support ETN procedures, a system element needs to support at least the ETN signalling messages described above. Thus, it is not necessary to support the TFO protocol as such. This way ETN-capable system elements not supporting audio transmission may proceed to the second in-band signalling protocol if they receive TFO messages from the other end.

Referring again to FIG. 2, according to a preferred embodiment of the invention, the second protocol is initiated (206) if there is at least one system element not supporting the first in-band signalling protocol ETN (when checking support for the first in-band signalling protocol ETN 202) and at least one system element not supporting TFO (when checking support for TFO 204). Advantageously, the second in-band signalling protocol is initiated between the system elements if no ETN or TFO messages are received (by the ETN-capable system element) within a pre-defined time limit. In case of non-speech system element, it may initiate the second protocol if it does not receive ETN messages. In order to minimise the delay, the time limit should be small.

The V.140 phase 1 according to prior art begins after the establishment of an end-to-end digital connection between terminals. A repeating 80-bit pattern containing at V.140 signature is transmitted. The purpose of the signature is to indicate to the far-end that this terminal implements V.140, and is capable of proceeding to the following phases 2 and 3. If a V.140 signature is detected in received data, this indicates that the far-end also supports V.140.

Figure 4:
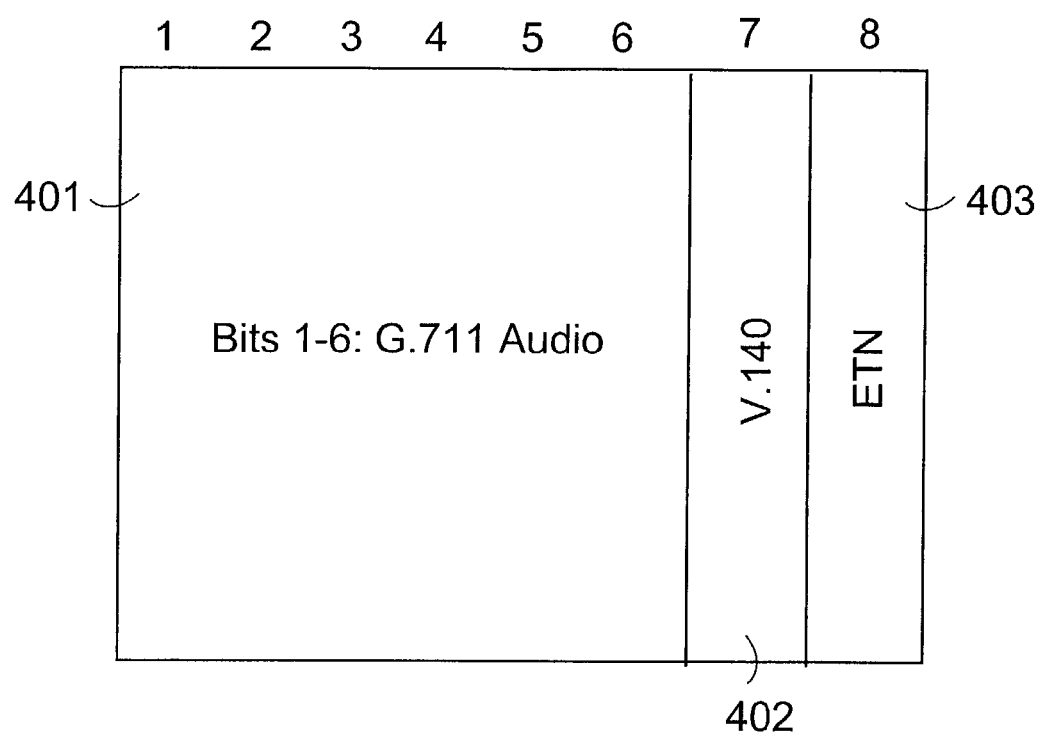
FIG. 4 illustrates a signal between system elements according to an embodiment of the invention.

According to a preferred embodiment of the invention, a slightly modified V.140 protocol is used for communication mode selection. Advantageously, the ETN-capable system element starts to send V.140 signatures and ETN messages at the same time if no ETN or TFO messages are received within a first pre-defined time limit. Referring to FIG. 4, the ETN messages may be transmitted in bit number 8 (least significant bit) (403), i.e. in sub-channel 8, and the V.140 phase 1 sub-channel 7 comprising the V.140 signatures may be transmitted in sub-channel 7 (402). Thus, sub-channels 1 to 6 may be used to carry G.711 audio (401).

The system element may stop the transmission of ETN messages and send the V.140 phase 1 signal according to prior art if no ETN or V.140 messages are received within a second pre-defined time limit. After the connection is established, it is also possible to send the V.140 phase 1 signatures without any pre-defined time limit simultaneously with the ETN messages.

If the system elements receive a V.140 signature from each other, the V.140 phase 2 according to prior art may be entered. The nature of the end-to-end digital link, including rate and bit alignment, is confirmed in the V.140 phase 2. In phase 3, the system elements exchange information on supported communication modes, select a communication mode and initiate operation in the selected mode.

If after a time-out, the V.140 signature has not been found in phase 1, the system element may proceed with any other non-V.140 protocol it supports. Preferably the system element then falls back to the ordinary G.711 audio transmission. For more details on the V.140, a reference is made to the ITU-T Recommendation V.140 "Procedures for establishing communication between two multiprotocol audiovisual terminals using digital channels at a multiple of 64 or 56 kbit/s", February 1998.

The advantage of the mode selection procedures according to the preferred embodiment of the invention is that a communication mode may be negotiated or re-negotiated quickly by in-band signalling with less errors and audio may be transmitted at the same time with minimal corruption.

The TFO protocol is widely used in mobile networks and with ETN other communication modes may also be selected still supporting only TFO capable system elements. If the other system element supports V.140, a rapid change to V.140 procedures is also enabled. Furthermore, a single numbering scheme is possible since the procedures according to the invention can be used to select the correct communication mode instead of separating different modes with numbers.

In the following some examples of applying the procedures described above will be illustrated again with reference to FIG. 1.

MS1 originates a video call to MS2, which both support UMTS video calls. During the call set-up, MSC1/IWF does not know whether MS2 supports video and the interworking function of MSC1/IWF is instructed to start the ETN procedures after the connection has been established with MSC2/IWF. MSC1/IWF sends ETN messages which indicate that it supports video types 1 and 2. MSC2/IWF also supports ETN and it replies with ETN messages that indicate the support for video types 2 and 3. MSC1/IWF and MSC2/IWF notice that they should select video type 2. Further ETN procedures are not needed and a video connection according to video type 2 (for example the H.324) may then be set-up.

In a second example, MS1 originates a video call to MS3 which supports GSM video calls and V.140. During the call set-up, MSC1/IWF does not know whether MS3 supports video and, again, the interworking function of MSC1/IWF is instructed to start the ETN procedures indicating support for video types 1 and 2 after the connection has been established with MSC3/IWF. MSC1/IWF sends ETN messages and it also advantageously starts to send V.140 phase 1 signatures as it does not receive any ETN or TFO messages within a pre-defined time limit from MSC3/IWF. MSC3/IWF replies with the V.140 signal and, using V.140 procedures, MSC1/IWF and MSC3/IWF negotiate a video connection. If no common video type is found, the connection may fall back to speech TFO or to G.711 audio if TFO is not supported. If the MSC3/IWF-supported ETN, the communication mode selection would be faster.

In a third example, MS1 originates a video call to MS4 which supports only GSM speech. During the call set-up, MSC1/IWF does not know whether MS4 supports video and, again, the interworking function of MSC1/IWF is instructed to start the ETN procedures indicating support for video types 1 and 2 after the connection has been established with MSC3/IWF. When MSC3/IWF notices that it does not support the incoming modes, it switches the connection to TRAU3. TRAU3 replies to ETN messages with ordinary TFO messages. MSC1/IWF notices that the reply is basic TFO and switches the connection to TRAU1. Thus, a TFO speech connection may be set-up between TRAU1 and TRAU3. Advantageously, MS1 is also notified that a speech call is initiated instead of a video call. Also, when a mobile-to-mobile video call falls back to a speech call (e.g. because of increased traffic load in the network), the TFO speech call may be reached quickly by the procedures described earlier.

In a fourth example, an IP video phone TE using a V.34 modem as transport mechanism for video data calls the UMTS mobile terminal MS1. The interworking function of MSC1/IWF (which could be located at the edge of the IP core network) gets a notice about an incoming call. However, TE does not support any video-specific out-band signalling and, therefore, the interworking function of MSC1/IWF does not get any out-band indication about the call and it answers towards the TE by the ETN procedures. This means that ETN messages are sent first and when no reply is received within a pre-defined time limit, a signal comprising ETN messages and V.140 signatures is advantageously sent. Possibly after another time limit only at V.140 phase 1 signal is sent. TE supports V.140 and it replies by a V.140 phase 1 signal. When the interworking function of MSC1/IWF receives the reply from TE, it enters the V.140 procedures and the modem/video mode may be negotiated according to the V.140 phases 2 and 3. It should be noted that if the TE also supported ETN, the right mode would be chosen sooner.

In the previous example, an ETN-capable IP gateway may be located between the IP video phone TE and the interworking function of MSC1/IWF. The IP gateway detects that this is a video call (either from the out-band or in-band information) and starts ETN negotiations with the interworking function of MSC1/IWF. Thus, a video call may be established. In case of a fax call, the same ETN procedures could be used.

Although the previous examples involve system elements of mobile networks, the invention may also be used between system elements of any kind of fixed and/or mobile telephony and/or data network. Furthermore, the system elements may belong to public or private networks. For example, the procedures described above could be used between computers supporting different communication modes.

The present invention can be implemented in existing and forthcoming system elements. They all have processors and memory providing the means for implementing the inventive functionality described above. The inventive functionality may be implemented as a memory-stored control program of a processor.

The accompanying drawings and the description pertaining to them are only intended to illustrate the present invention. Different variations and modifications to the invention will be apparent to those skilled in the art, without departing from the scope and spirit of the invention defined in the appended claims.

The invention claimed is:

1. A method for negotiating a used communication mode between system elements in a telecommunications system, the method comprising:
   performing message exchange between the system elements,
   checking based on the exchanged messages if the system elements support a first in-band signalling protocol,
   selecting the communication mode according to said first signalling protocol based on supported communication modes if the system elements support said first signalling protocol,
   if there is at least one system element not supporting said first signalling protocol, checking based on the exchanged messages if the system elements support a tandem free operation (TFO) in-band signalling protocol, and
   continuing communication between the system elements according to the procedures of the TFO protocol if the system elements support the TFO protocol.

2. A method according to claim 1, further comprising: selecting the communication mode between the system elements according to a second in-band signalling protocol if there is at least one system element not supporting said first signalling protocol when checking the support for said first signalling protocol and there is at least one system element not supporting the TFO protocol when checking the support for the TFO protocol.

3. A method according to claim 1, wherein the communication modes supported by the system elements are indicated if the system elements support said first signalling protocol,
   the supported communication modes in the exchanged messages of said first signalling protocol are checked, and
   a communication mode that the system elements support is selected.

4. A method according to claim 3, wherein
   the communication modes are prioritized, and the communication mode is selected based on the prioritization.

5. A method according to claim 2, wherein messages according to said first signalling protocol are sent from a system element to another system element,
   messages of both said first signalling protocol and said second signalling protocol are sent to the other system element if no messages according to said first signalling protocol are received from the other system element within a first pre-defined time limit, and
   messages to the other system element are sent according to said second signalling protocol if no messages according to said first or said second signalling protocol are received from the other system element within a second pre-defined time limit.

6. A method according to claim 2, wherein said second signalling protocol is based on the V.140 protocol.

7. A method according to claim 5 or 6, wherein messages comprising V.140 signatures are sent by the system elements according to the second in-band signalling protocol,
   the connection between the system elements is checked by V.140 phase 2 procedures if the system elements receive at least one V.140 signature, and
   the used communication mode is negotiated by V.140 phase 3 procedures if the phase 2 procedures are successful.

8. A method according to claim 1, wherein said first signalling protocol is based on the tandem-free operation (TFO) protocol.

9. A method according to claim 1, wherein the messages according to said first signalling protocol are sent by the least significant bits of the connection between the system elements.

10. A method according to claim 1, wherein the communication mode is a multimedia call.

11. An apparatus in a telecommunications system in which a connection is arranged between said apparatus and one or more other parties,
   said apparatus is configured to check if the other parties of a connection support a first in-band signalling protocol,
   said apparatus is configured to negotiate the communication mode with the other parties based on supported communication modes according to said first signalling protocol if the other parties support said first signalling protocol,
   said apparatus is configured to, if there is at least one other party not supporting said first signalling protocol, check if the other parties support a tandem free operation (TFO) in-band signalling protocol, and
   said apparatus is configured to continue communication with the other parties according to the TFO protocol if the other parties support the TFO protocol.

12. An apparatus according to claim 11, wherein said apparatus is configured to negotiate the communication mode with the other parties according to a second in-band signalling protocol if there is at least one other party not supporting said first signalling protocol when checking the support for said first signalling protocol and there is at least one other party not supporting the TFO protocol when checking the support for the TFO protocol.

13. An apparatus according to claim 11, wherein said apparatus is configured to search at least for messages according to said first signalling protocol from the other parties and for messages according to the TFO protocol from the other parties.

14. An apparatus according to claim 12 or 13, wherein said apparatus is configured to send messages to the other parties according to said first signalling protocol to check if the other parties support said first signalling protocol or the TFO protocol at least if said apparatus has initiated the connection with the other end or if said apparatus does not support the messages received from the other parties, and said apparatus is configured to send messages to the other parties according to said first signalling protocol and said second signalling protocol if no messages according to said first signalling protocol are received from the other parties within a first pre-defined time limit, and said apparatus is configured to send messages to the other parties according to said second signalling protocol if no messages according to said first or said second signalling protocol are received from the other parties within a second pre-defined time limit.

15. An apparatus according to claim 11, wherein said apparatus is configured to send an indication on the supported communication modes to the other parties if the other parties support said first signalling protocol, said apparatus is configured to check the communication modes supported by the other parties, and said apparatus is configured to select a communication mode that the other parties also support.

16. An apparatus according to claim 15, wherein said apparatus is configured to select the communication mode if said apparatus has initiated the connection with the other parties or if the other parties have permitted said apparatus to select the communication mode.

17. An apparatus according to claim 12, wherein said apparatus is configured to send messages to the other parties comprising V.140 signatures according to said second signalling protocol, said apparatus is configured to execute V.140 phase 2 procedures if it receives at least one V.140 signature from the other parties, and said apparatus is configured to negotiate the used communication mode with the other parties by V.140 phase 3 procedures if the phase 2 procedures are successful.

18. An apparatus according to claim 11, wherein said first signalling protocol is based on the tandem-free operation (TFO) protocol.

19. An apparatus according to claim 11, wherein said apparatus is a network element such as a mobile switching centre comprising an interworking function.

20. An apparatus according to claim 11, wherein said apparatus is a terminal comprising a terminal adaptation function.

21. An apparatus according to claim 11, wherein said apparatus comprises transmission and reception means for sending and receiving in-band signalling messages to and from the other parties, checking means for checking the signalling protocols and communication modes supported by the other parties based on the received signalling messages, and selecting means for selecting the communication mode based on the signalling protocols and communication modes supported by the other parties.

* * * * *